(12) United States Patent
Krishnan et al.

(10) Patent No.: US 9,338,201 B2
(45) Date of Patent: May 10, 2016

(54) PRESENTATION DELAY FEEDBACK IN A WEB CONFERENCING SESSION

(71) Applicant: Avaya Inc., Basking Ridge, NJ (US)

(72) Inventors: Parameshwaran Krishnan, Basking Ridge, NJ (US); Navjot Singh, Denville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 407 days.

(21) Appl. No.: 13/861,471

(22) Filed: Apr. 12, 2013

(65) Prior Publication Data

US 2014/0310347 A1 Oct. 16, 2014

(51) Int. Cl.
*H04L 29/06* (2006.01)

(52) U.S. Cl.
CPC ........ *H04L 65/4038* (2013.01); *H04L 65/1093* (2013.01)

(58) Field of Classification Search
CPC ............ H04L 65/1093; H04L 65/4038; H04L 12/1822; G06Q 10/10; H04M 3/42221
USPC ......... 709/203, 204, 217, 218, 224, 227, 228, 709/229
See application file for complete search history.

(56) References Cited

U.S. PATENT DOCUMENTS

2007/0271335 A1\* 11/2007 Bostick et al. ................ 709/204

\* cited by examiner

*Primary Examiner* — Kim T Nguyen (57) ABSTRACT

Embodiments disclosed herein provide methods and systems for providing presentation delay feedback to a presenter in a web conferencing session. In a particular embodiment, a method includes receiving, from a presenter client, a request to initiate a web conferencing session. The method further includes establishing the web conferencing session between the presenter client and at least one viewing client. During the web conferencing session, the method includes determining delays in presenting a view of the web conferencing session at each of the at least one viewing clients and providing an indication of the delays to a user at the presenter client.

20 Claims, 8 Drawing Sheets

PRESENTATION DELAY FEEDBACK IN A WEB CONFERENCING SESSION

TECHNICAL BACKGROUND

Web conferencing servers facilitate web conferencing sessions between two or more web conferencing clients. During a web conferencing session, a user of one of the web conferencing clients may present information, such as slides, video, audio, animations, or some other type of information that may be presented to users of other clients on the web conferencing session. Some or all of this information may not be synchronized with the audio and/or video of the user presenting the information. Accordingly, the information may be received and presented at the other clients out of sync with the audio/video of the presenter.

The above situation could lead to confusion of the users at the other clients because the presenter may begin discussing information that the users have yet to receive. Aware of this problem, a presenter may set up his or her own viewing client to view the presentation information in order to ensure that the presentation information has propagated to other clients before continuing with the presentation. However, this method requires another web conferencing client be set up by the presenter and does not account for any difference in delay that may occur between the presenter's viewing client and the other clients on the web conference. Thus, even if the presenter continues the presentation based on the delay seen at the presenter's viewing client, the other clients on the web conference may be experiencing a different delay and remain out of sync with the presentation.

OVERVIEW

Embodiments disclosed herein provide methods and systems for providing presentation delay feedback to a presenter in a web conferencing session. In a particular embodiment, a method includes receiving, from a presenter client, a request to initiate a web conferencing session. The method further includes establishing the web conferencing session between the presenter client and at least one viewing client. During the web conferencing session, the method includes determining delays in presenting a view of the web conferencing session at each of the at least one viewing clients and providing an indication of the delays to a user at the presenter client.

In some embodiments, the indication informs the user of a delay determined at a most delayed viewing client of the at least one viewing clients.

In some embodiments, the indication informs the user of an average delay for at least a portion of the at least one viewing clients.

In some embodiments, at least the portion of the at least one viewing clients comprises a majority of the at least one viewing clients.

In some embodiments, the method provides that determining the delays comprises receiving, from each of the at least one viewing clients, an indication of a view of the web conferencing session as currently presented at each of the at least one viewing clients. The method further includes, based on the indication, determining the delays based on the difference in web conferencing session run time between a view of the web conferencing session currently being received from the presenter client and the view of the web conference as currently presented at each of the at least one viewing clients.

In some embodiments, the difference in web conferencing session run time is determined based on a watermark added to the web conferencing session.

In some embodiments, the indication comprises a presentation of a monitor view of the web conferencing session as presented at one of the at least one viewing clients.

In some embodiments, the indication further comprises an indication of the number of the at least one viewing clients seeing the monitor view of the web conferencing session.

In some embodiments, the indication comprises a guide to the user of the presentation client for pacing a presentation that is the subject of the web conferencing session.

In some embodiments, the indication comprises a delay value representing the delays in presenting the view of the web conferencing session.

In another embodiment, a web conferencing server is provided. The web conferencing server includes a communication interface configured to receive, from a presenter client, a request to initiate a web conferencing session. The web conferencing server further includes a processing system configured to establish the web conferencing session between the presenter client and at least one viewing client and, during the web conferencing session, determine delays in presenting a view of the web conferencing session at each of the at least one viewing clients and provide an indication of the delays to a user at the presenter client.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
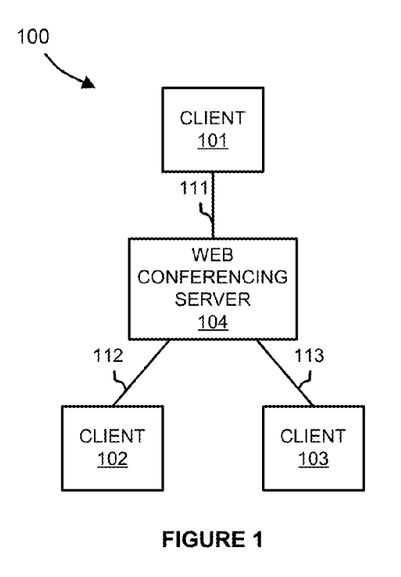
FIG. 1 illustrates a web conferencing system for providing presentation delay feedback to a presenter in a web conferencing session.

FIG. 1 illustrates web conferencing system 100. Web conferencing system 100 includes web conferencing clients 101-103 and web conferencing server 104. Web conferencing client 101 and web conferencing server 104 communicate over communication link 111. Web conferencing client 102 and web conferencing server 104 communicate over communication link 112. Web conferencing client 103 and web conferencing server 104 communicate over communication link 113.

In operation, web conferencing clients 101-103 exchange communications with web conferencing server 104 to facilitate the presentation of a web conferencing session. A web conferencing session is any type of conference that takes place over some type of communication network and does not necessarily have to take place over the web. In some embodiments, clients 101-103 may comprise computer instructions stored on a computer readable medium and executing on a processor of a computing device, such as a stand alone web conferencing application, a web site or some other type of web browser based executable, or any other type of software than can execute on a computing device. The computing device may be a desktop computer, laptop computer, tablet computer, smartphone, dedicated web conferencing appliance, or any other type of computing device. In this disclosure, the term client may at times refer interchangeably to the web conferencing software or the computing device on which the web conferencing software executes.

When participating in a web conferencing session, web conferencing server 104 coordinates presentation information received from a client operated by a presenter of the web conferencing session with the other clients on the web conferencing session. The presentation information may include graphics, pictures, audio, video, or any other type of information that may be presented in a web conferencing session—including combinations thereof. Regardless of the type of presentation information included in the web conferencing session, it takes time for web conferencing server 104 to propagate the web conferencing session from a presenter client to other clients viewing the web conferencing session. The amount of time required to propagate the session to each of the other viewing clients may vary between each of the clients and depend on the resources used to propagate the session from a presenter client to the viewing clients via web conferencing server 104. The resources may include available bandwidth on communication links 111-113, throughput capacities of any intervening communication network, system, and device, processing loads on any intervening communication network, system, and device, or any other factor that may effect the propagation of data to a web conferencing client.

Regardless of what factor(s) causes a delay in the web conferencing session's propagation to one or more viewing clients, without knowledge of the delay the presenter of the web conferencing session may continue his or her presentation. For example, in exemplary web conferencing sessions where audio and/or video of the presenter are not synchronized with other presentation information (i.e. other audio/video, presentation slides, graphics, sounds, or any other type of information), a delay for the other presentation information may cause the presenter to begin referencing portions of the other presentation information before the viewing client is presenting that other presentation information. In such circumstances, without the delayed other presentation information, a viewer of the web conference at the delayed viewing client may not fully understand the web conferencing session.

Figure 2:
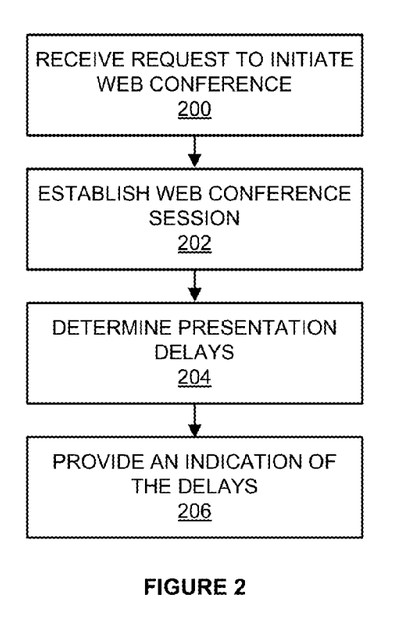
FIG. 2 illustrates an operation of the web conferencing system for providing presentation delay feedback to a presenter in a web conferencing session.

FIG. 2 illustrates an operation of web conferencing system 100 to provide presentation delay feedback to a presenter in a web conferencing session. Web conferencing server 104 receives, from a presenter client 101, a request to initiate a web conference session (step 200). The request may be transferred to web conferencing server 104 in response to presenter client 101 receiving an instruction from a user (presenter) to initiate the web conferencing session. The request may identify clients 102 and 103 as viewing clients for the web conferencing session or viewing clients 102 and 103 may identify themselves to web conferencing server 104 in some other way. For example, viewing clients 102 and 103 may transfer an identifier for the web conferencing session to web conferencing server 104 so that viewing clients 102 and 103 can participate in the web conferencing session. Other methods of requesting a web conferencing session between clients 101-103 may also be used. While this embodiment includes two viewing clients 102 and 103, there may be any number of at least one viewing clients.

In response to the request, web conferencing server 104 establishes the web conference session between the presenter client and viewing clients 102 and 103 (step 202). The web conferencing session is established using any web conferencing protocol that is supported by clients 101-103 and web conferencing server 104. The web conferencing session is established in accordance with any parameters for the web conferencing session that may have been included in the request, in another message transferred from presenter client 101, in a message from client 103, in a message from viewing client 103, in default parameters, or any other way of providing parameters for a web conferencing session—including combinations thereof. The parameters may include a parameter indicating that the user of presenter client 101 desires delay feedback from viewing clients 102-103 and may further indicate how the delay feedback is presented at presenter client 101. Alternatively, web conferencing server 104 may provide delay feedback automatically without the need for a parameter instructing web conferencing server 104 to do so.

During the web conferencing session, web conferencing server 104 determines delays in presenting a view of the web conferencing session at each of viewing clients 102 and 103 (step 204). The delay in presenting the view of the web conferencing session may be caused by low bandwidth on a link to one or both of clients 102 and 103, based on resource limitations on systems or devices on the link to one of clients 102 and 103, resource limitations on the client devices themselves, or any other reason that may cause a delay in presenting a view of a web conferencing session. Web conferencing server 104 may use any method of determining a delay in the presentation of a view transferred to viewing client. The delay may be determined as a time (or web conference duration) from when the view of the web conferencing session was transferred by presenter client 101 until the view is presented at each viewing client 102 and 103, as the time from when the view is received from presenter client 101 until the view is presented at each viewing client 102 and 103, as the time from when the view is transferred from web conferencing server 104 until the view is presented at each viewing client 102 and 103, or as the time between any other two points in the provision of the web conferencing session that is capable of representing a delay in presenting a view of a web conference session.

In a particular example, to determine the delay, web conferencing server 104 may receive an indicator of a current view of the web conferencing session being displayed by each of clients 102 and 103. The indicator may be sent from clients 102 and 103 periodically, upon request from web conferencing server 104, upon presenting a new view at viewing client 102 or 103 (i.e. changing from one slide to the next), or upon some other trigger condition. The indicator may be based on time stamps for the web conferencing session. For example, client 102 or 103 may transfer a time stamp for the view currently being presented and web conferencing server can compare that time stamp to a time stamp of a view of the web conferencing session currently being received from presenter client 101. The difference in the time stamps would be the delay.

Alternatively, the indicator may be an identifier for the view itself. For example, if the view is a presentation slide, then the indicator may be a position of the slide in a sequence of slides (eg. a slide number) or may be otherwise designated. Thus, client 102 or 103 may transfer a designator of the currently presented slide at each client so that web conferencing server 104 can determine whether that slide is the slide currently presented at presenter client 101 and, if not, determine how many slides behind is the viewing client. In some embodiments, instead of a separate designator, web conferencing server 104 may be able to process and recognize the slide itself.

In yet further embodiments, presenter client 101 or web conferencing server 104 may add a watermark to views of the web conferencing session before transferring the views of the web conferencing session to viewing clients 102 and 103. The watermark may change over time and web conferencing server 104 may track the progression of the watermark to aid in delay determination. In those embodiments, clients 102 and 103 may indicate which watermark each client is currently presenting so that web conferencing server 104 can determine a delay.

Once delays for viewing clients 102 and 103 have been determined, web conferencing server 104 provides an indication of the delays to the user at presenter client 101 (step 206). The indication may take any form that signifies to the presenter a delay for clients 102 and 103 either individually or on a collective basis. For example, the indication may be based on the delay at a most delayed client or an average delay across all clients or across a percentage of clients (i.e. a majority of clients, the top number of most delayed clients, or a number of clients with delays the above a threshold delay value). The indication may be presented to a user of presenter client 101 using any means for providing information regarding the delay in viewing the web conferencing session at viewing clients or otherwise provide information to the presenter about how the presenter should pace the presentation based on the delay.

In some embodiments, providing the indicator comprises displaying the view of the web conferencing session as being currently seen at clients 102 and/or 103 (i.e. the video feed, slide, etc. of the presentation as currently being displayed at clients 102 and/or 103). The view at clients 102 and/or 103 may be transferred from web conferencing server 104 as a video stream, on an individual slide basis, or any other. Alternatively, the view may be stored in memory for client 101 since client 101 was the client that originally transferred the view. Web conferencing server 104 may therefore indicate a view or position in the web conferencing session and then presenter client 101 finds the position in the web conferencing session stored in memory for display to the user.

In other embodiments, a value representing the amount of delay (i.e. a time value) may be presented to the user of presenter client 101. A separate value may be presented for all viewing clients or for a portion of the viewing clients. Alternatively, as mentioned above, the value may be based on an average of all or a portion of the viewing clients.

In further embodiments, the indicator may provide an indication of how the user(s) of presenter client 101 should pace the presentation based on the determined delays. For example, the indicator could be a bad, better, best type indicator, such as red, yellow, green, which indicates to the user whether the user should slow down or maintain a certain pace of the presentation. In other words, if the delay is bad, then the indicator may suggest that the user stop or at least slow down the presentation so that the web conferencing session can catch up at the effected viewing clients.

Different indicator types may be preferred for different types of presentations. Likewise, combinations of indicator types may be used to provide additional information. For example, a delay time indication and/or a monitor view of the delayed viewing clients may be desired for video presentations while a pacing indicator may be desired for slide presentations, although other indicator types may be used in either circumstance.

In some embodiments, the user of presenter client 101 selects a desired indicator type and client 101 notifies web conferencing server 104 of the selected indicator type. The notification of the selected indicator type may be included in the request for the web conferencing session or may be transferred at another time. In other embodiments, the indicator type may be preprogrammed into web conferencing server 104.

In some embodiments, web conferencing server 104 may be configured to transfer reduced quality presentation information (e.g. lower resolution pictures or video) to viewing clients that are determined to have a delay above a threshold. Reducing quality typically results is lower data throughput, which may overcome at least some of the problems causing the delay. Thus, instead of the user of presenter client 101 having to continually wait for viewing clients 102-103 to catch up, the reduced quality should help the viewing clients catch up faster and proceed with less delay. Web conferencing server 101 may be configured to automatically reduce quality in response to a delay threshold being met and/or may be configured to receive an instruction from one or more of clients 101-103 to reduce quality. The instruction from clients 101-103 may come at the request of a user.

Referring back to FIG. 1, the computing devices on which clients 101-103 execute comprise wireless and/or wired communication circuitry and processing circuitry. The communication circuitry may include an amplifier, filter, modulator, and signal processing circuitry. The computing devices may also include a user interface, memory device, software, or some other communication components. The computing devices may be a telephone, computer, e-book, mobile Internet appliance, wireless network interface card, media player, game console, or some other wireless communication apparatus—including combinations thereof.

Web conferencing server 104 comprises a computer system and a communication interface. Web conferencing server 104 may also include other components such a router, data storage system, and power supply. Web conferencing server 104 may reside in a single device or may be distributed across multiple devices.

Communication links 111-113 use metal, glass, air, space, or some other material as the transport media. Communication links 111-113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-113 could be direct links or may include intermediate networks, systems, or devices.

Figure 3:
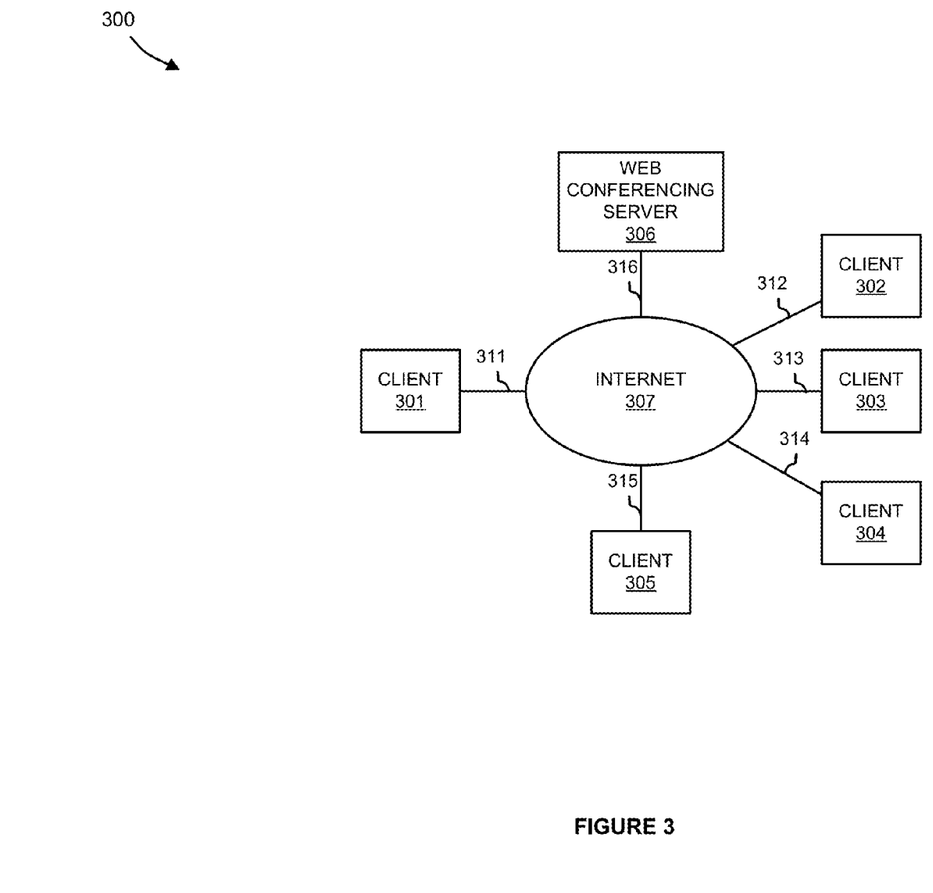
FIG. 3 illustrates a web conferencing system for providing presentation delay feedback to a presenter in a web conferencing session.

FIG. 3 illustrates web conferencing system 300. Web conferencing system 300 includes web conferencing clients 301-305, web conferencing server 306, and Internet 307. Web conferencing clients 301-305 and Internet 307 communicate over communication links 311-315, respectively. Web conferencing server 306 and Internet 307 communicate over communication link 316. While shown as communicating over Internet 307, any number of clients 301-305 and web conferencing server 306 may be collocated and, thereby, communicate over a local area network rather than Internet 307. Additionally, while not shown, clients 301-305 and web conferencing server 306 may connect to Internet 307 through various access networks.

Figure 4:
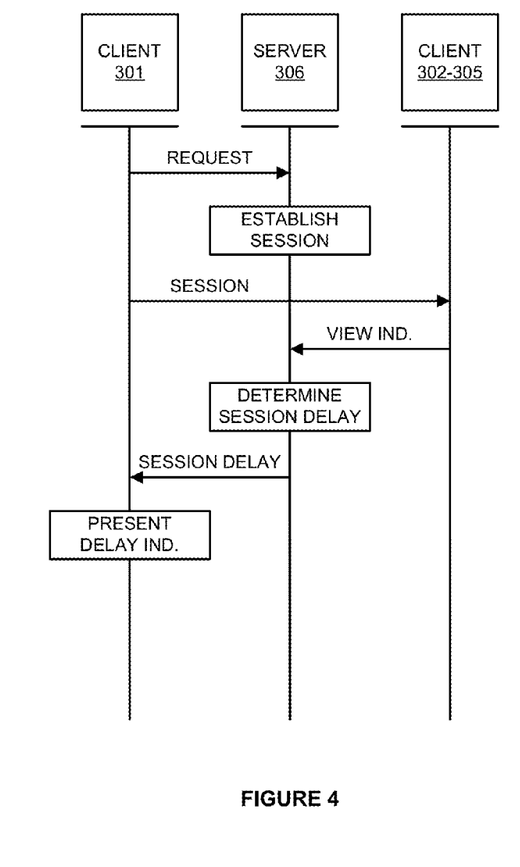
FIG. 4 illustrates an operation of the web conferencing system for providing presentation delay feedback to a presenter in a web conferencing session.

FIG. 4 illustrates an operation of web conferencing system 300 to provide presentation delay feedback to a presenter in a web conferencing session. In the operation, a user of client 301 indicates that client 301 should begin a web conferencing session. This user indication may be made via a user interface of client 301. In response, client 301 transfers a request to web conferencing server 306 to initiate the web conferencing session requested by the user. The user may have indicated in the request that clients 302-305 are to be viewing clients on the call based on identifiers for viewing clients 302-305, viewing clients 302-305 may connect to the web conferencing session using an identifier for the web conferencing session, or viewing clients 302-305 may be added to the web conferencing session in some other manner.

Web conferencing server 306 then establishes a web conferencing session in response to the request. Accordingly, client 301 transfers information related to the web conferencing session to viewing clients 302-305 via web conferencing server 306. While the information for the web conferencing session is illustrated as going from presenter client 301 to viewing clients 302-305, information for the web conferencing session may also be transferred back to client 301 as well as being transferred among clients 302-305. For example, there may be an audio or video feed associated with the web conferencing session allowing the users of clients 301-305 to collaborate without needing to set up another conference modality, such as a traditional conference call, outside of the web conferencing session.

During the web conferencing session, viewing clients 302-305 each transfer an indication of a view of the web conference session that each client is currently displaying. Web conferencing server 306 uses the four indications to determine delays in displaying the view of the web conference session at each of viewing clients 302-305. After determining the session delays, web conferencing server 306 transfers a notification of the delays to presenter client 301. The notification of the delays may comprise an individual delay indication for each viewing client 302-305, for only a portion of the viewing clients 302-305, or may be a delay indication, such as an average, for at least a portion of the viewing clients 302-305 in combination, such as a number of the viewing clients that have a delay greater than a threshold.

Upon receiving the notification of the session delays, presenter client 301 provides an indication of the session delays to the user of presenter client 301. The user of presenter client 301 may thereby use the provided indication to determine whether the user should slow down or stop a presentation in order for the web conferencing session to catch up at delayed viewing clients. The indication may be provided in any way that will notify the user of presentation client 301 that one or more of viewing clients 302-305 are experiencing delay in providing the web conferencing session. Some exemplary indications are discussed below.

Figure 5:
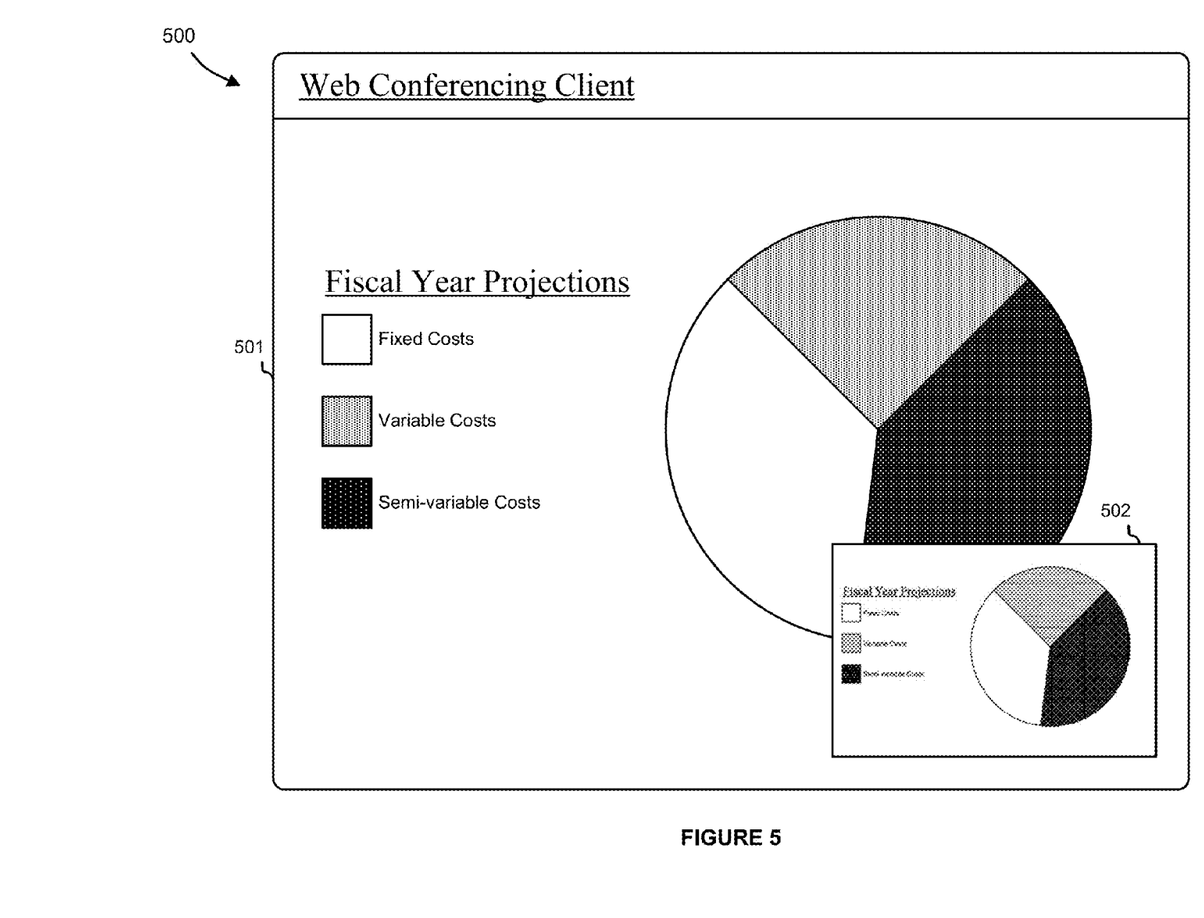
FIG. 5 illustrates a presenter client window for providing presentation delay feedback to a presenter in a web conferencing session.

FIG. 5 illustrates web conferencing client window 500 to provide presentation delay feedback to a presenter in a web conferencing session. In this example, web conferencing client window 500 is a window of presenter client 301 and is displaying a slide 501 entitled "Fiscal Year Projections." Slide 501 may be displayed as part of a video stream or may be presented as a single image for display in the web conferencing session. Web conferencing client window 500 further displays monitor frame 502. While monitor frame 502 is displayed within window 500, in some embodiments monitor frame 502 may not be displayed within the same window as slide 501. For example, monitor frame 502 may be presented in a separate window.

Monitor frame 502 displays a view of the presentation presented on one or more of clients 302-305. In this case, monitor frame 502 displays the same slide that is currently being presented at presenter client 301. Monitor frame 502 may be displaying the slide as it is presented at the most delayed client or may be presenting a representation of a view as displayed at a combination of clients 302-305. For example, monitor frame 502 may represent the view that was presented at clients 302-305 in accordance with an average delay. In other words, if the average delay is five seconds, then monitor frame 502 displays whatever slide was presented by presenter client 301 five seconds prior to the current time. Accordingly, upon seeing monitor frame 502, the user of presenter client 301 is notified that the delay determined by web conferencing server 306 is such that the presentation may continue.

However, depending on how the view of monitor frame 502 is determined, the view seen in monitor frame 502 does not necessarily mean that all viewing clients 302-305 are displaying an up to date slide. In the average delay example from above, when calculating the average delay, one of viewing clients 302-305 may be more delayed than the others. Thus, even though the average delay of viewing clients 302-305 shows the current slide in monitor frame 502, one or more clients may not be displaying the slide represented by the average delay. Thus, in practice, the user of presenter client 301 may know how the monitor slide is determined, either because the user provided the parameters for the monitor frame determination or is otherwise notified, and may pace the presentation accordingly.

Figure 6:
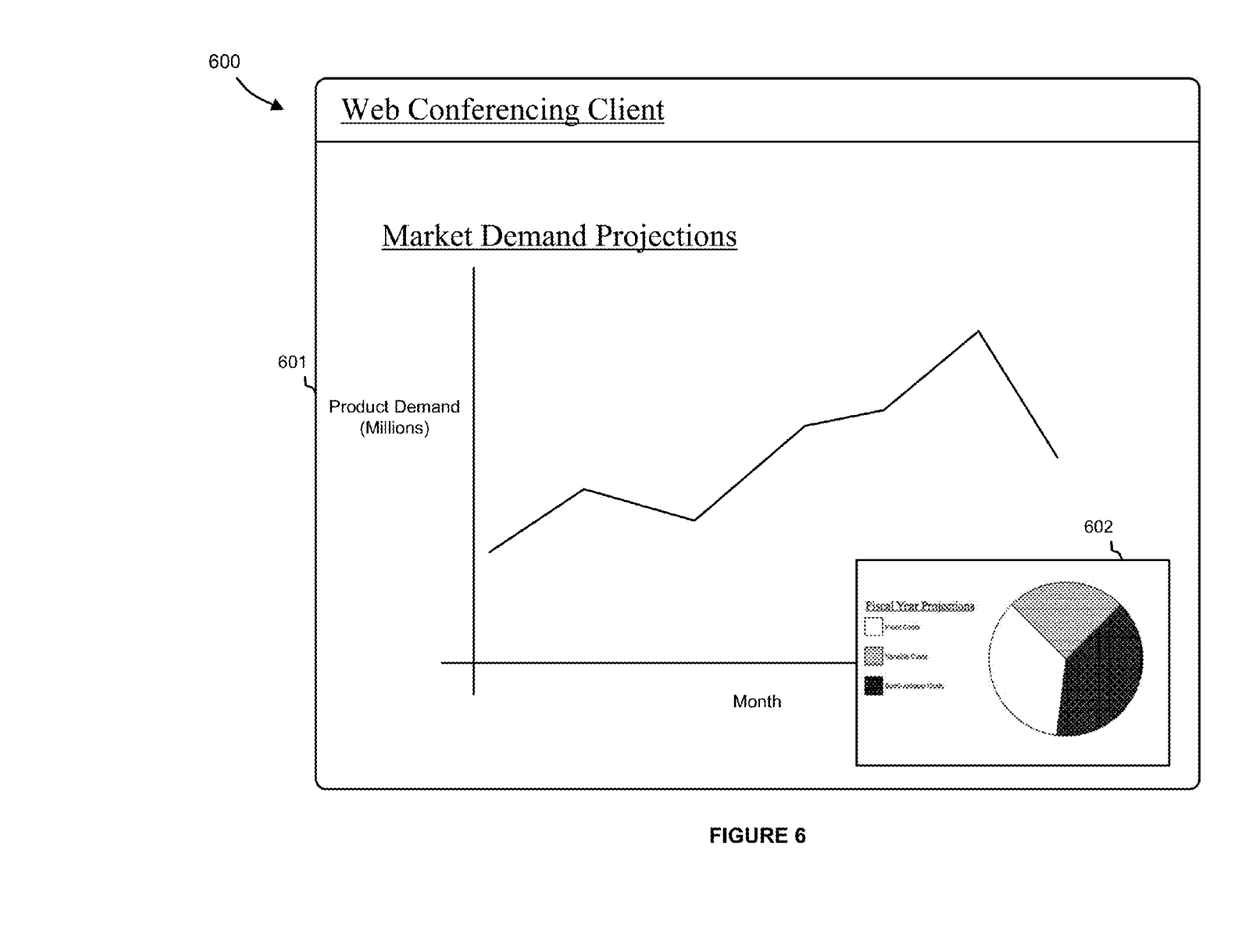
FIG. 6 illustrates a presenter client window for providing presentation delay feedback to a presenter in a web conferencing session.

FIG. 6 illustrates web conferencing client window 600 to provide presentation delay feedback to a presenter in a web conferencing session. In this example, web conferencing client window 600 is a window of presenter client 301 and is displaying a slide 601 entitled "Market Demand Projections." Furthermore, window 600 may be an example of window 500 after the presentation changes from slide 501 to slide 601.

In this example, monitor frame 602 is still displaying the "Fiscal Year Projections" slide even though presenter client 301 has proceeded to showing "Market Demand Projections" of slide 601. Accordingly, the user of presenter client 301 is notified that, regardless of how the delay is determined to display monitor frame 602, at least one of viewing clients 302-305 is not yet viewing the "Market Demand Projections" slide. The user, therefore, may not want to continue the presentation concerning slide 601 until monitor frame 602 displays the "Market Demand Projections" slide as well. In some embodiments, monitor frame 602 may further indicate a number of the viewing clients currently displaying the view in monitor frame and/or the identities of those clients.

Figure 7:
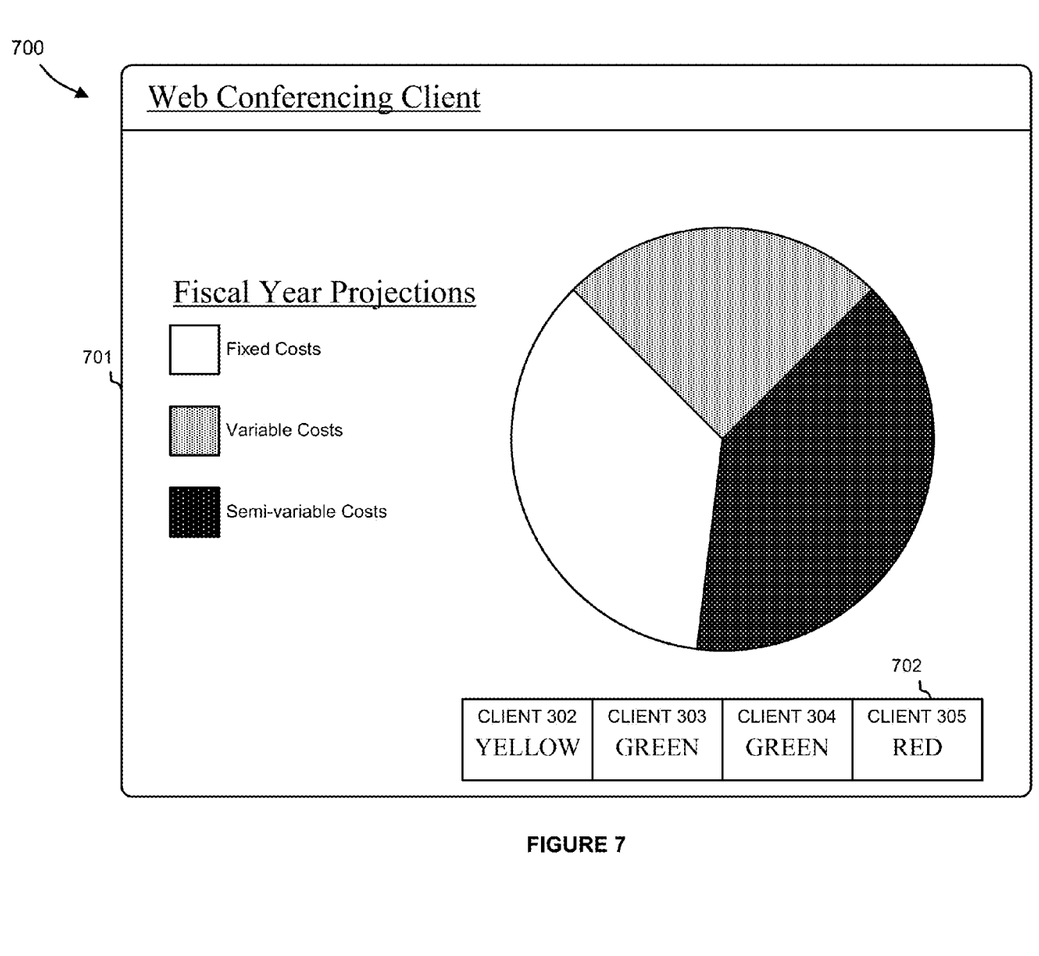
FIG. 7 illustrates a presenter client window for providing presentation delay feedback to a presenter in a web conferencing session.

FIG. 7 illustrates web conferencing client window 700 to provide presentation delay feedback to a presenter in a web conferencing session. In this example, web conferencing client window 700 is a window of presenter client 301 and is displaying a slide 701 entitled "Fiscal Year Projections." In this example, instead of displaying a slide view as in monitor views 502 and 602 discussed above, monitor element 702 displays an indicator of the delay at each viewing client 302-305, which the user of presenter client 301 may use as a reference to pace the presentation in accordance with the delay.

Specifically, monitor element 702 indicates one of three possible colors for each viewing client 302-305. The possible colors are green, yellow, and red. Green is displayed if the amount of delay for a particular client is less than a given delay value (e.g. less than a threshold amount of time). Red is displayed if the amount of delay for a particular client is greater than a given delay value, which is greater than the delay value used for green. Yellow is displayed if the amount of delay for a particular client is in between the two delay values. While this example uses colors to represent delay, other embodiments may use different indicators and have more or less than the three levels of delay indications provided in this embodiment.

In this example, monitor element 702 indicates that client 302 is yellow, client 303 is green, client 304 is green, and client 305 is red. Based on the information the user of presenter client 301 may determine to slow down or stop his or her presentation of the slides until clients 302 and 305 catch up. Similarly, the user could wait until client 302 turns green and 305 turns yellow, and pace the presentation that client 305 will be green shortly. The user may pace himself or herself in any other way he or she chooses based on the information provided by monitor element 702.

In some embodiments, monitor element 702 may not display a color for each viewing client 302-305 individually. For example, monitor element 702 may indicate a color for the viewing clients 302-305 as a group. As discussed above, this group color may be based on a delay average across all viewing clients 302-305.

Figure 8:
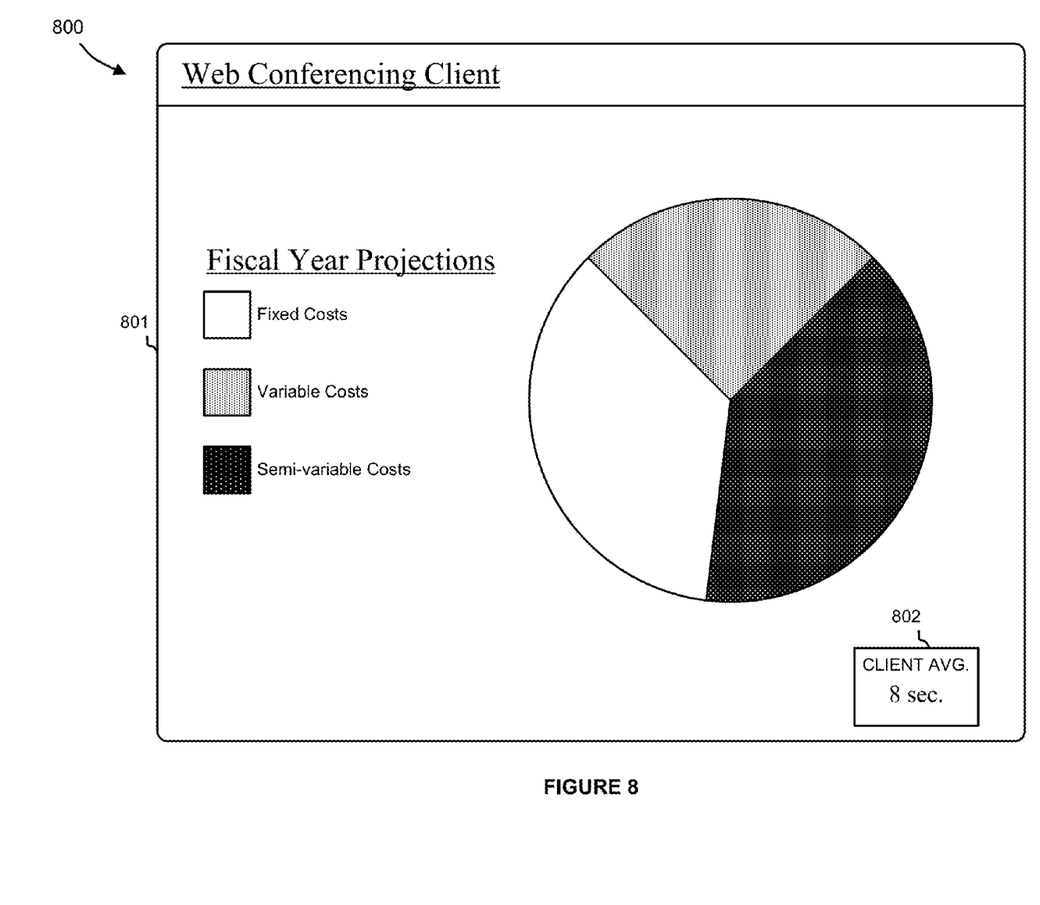
FIG. 8 illustrates a presenter client window for providing presentation delay feedback to a presenter in a web conferencing session.

FIG. 8 illustrates web conferencing client window 800 to provide presentation delay feedback to a presenter in a web conferencing session. In this example, web conferencing client window 800 is a window of presenter client 301 and is displaying a slide 801 entitled "Fiscal Year Projections." In this example, monitor element 802 indicates an average delay time across viewing clients 302-305. In particular, the view of the web conferencing session is delayed an average of 8 seconds. Therefore, when changing to a next slide, the user of presenter client 301 may want to hold off on discussing the next slide for a few seconds to allow the next presentation slide to be displayed on viewing clients 302-305. In some embodiments, monitor element 802 may provide an indication of the time delay for each viewing client individually rather than as an average. In further embodiments, a timer may count down from the delay value to indicate a time when the delayed viewing clients have caught up to the current position in the presentation.

It should be understood that the examples discussed in FIGS. 5-8 may be presented at client 301 in ways other than those described above. Additionally, combinations of the different examples, along with other delay indication means, may be presented at presenter client 301. For example, a monitor view element may display the average time delay for viewing clients 302-305 in addition to the display of the view of the web conferencing session.

Additionally, in some embodiments, a similar delay indication may be presented at one or more of viewing clients 302-305. For example, if a viewing client is delayed, then an indication provided to a user of the delayed viewing client may prompt the user to attempt to remedy the delay. In an alternative example, notifying users of other viewing clients of delayed clients may indicate to those users a reason for why the presenter may not be continuing the presentation immediately.

Figure 9:
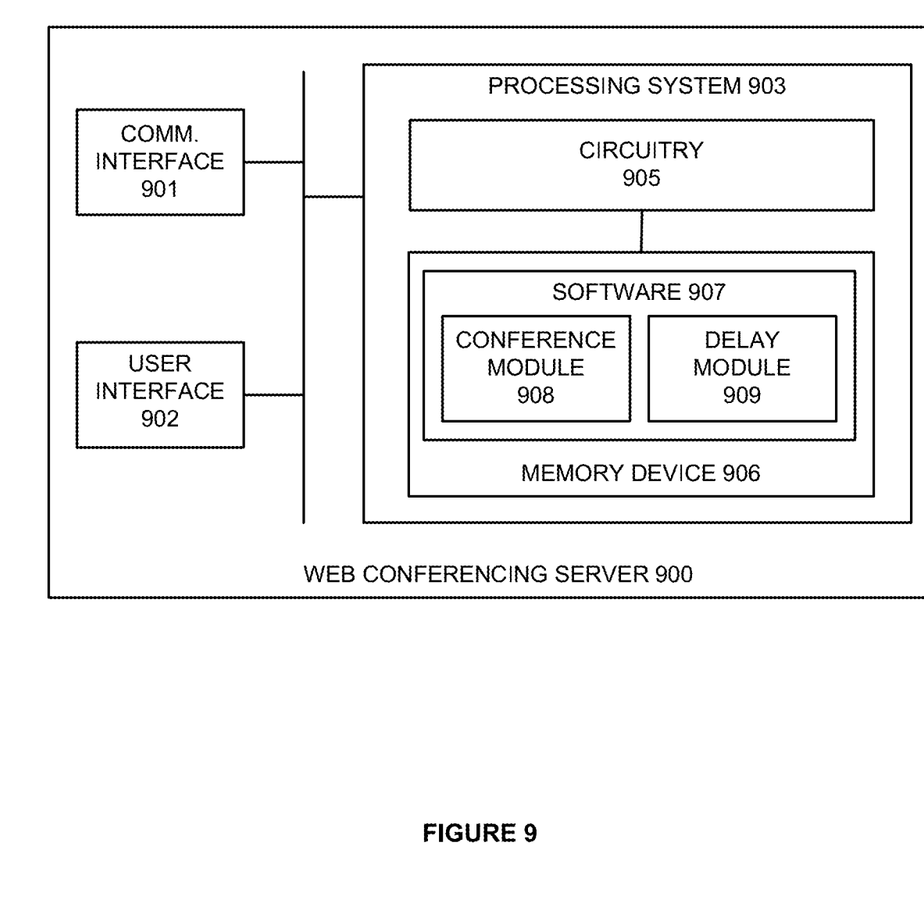
FIG. 9 illustrates a web conferencing server for providing presentation delay feedback to a presenter in a web conferencing session.

FIG. 9 illustrates web conferencing server 900. Web conferencing server 900 is an example of web conferencing servers 104 and 306, although servers 104 and 306 may use alternative configurations. Web conferencing server 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes web conferencing module 908 and delay module 909. Operating software 907 may further include an operating system, utilities, drivers, network interfaces, applications, or some other type of software. When executed by circuitry 905, operating software 907 directs processing system 903 to operate web conferencing server 900 as described herein.

In particular, web conferencing module 908 directs processing system 903 to receive, from a presenter client via communication interface 901, a request to initiate a web conferencing session and establish the web conferencing session between the presenter client and at least one viewing client. Delay module 909 directs processing system 903 to, during the web conferencing session, determine delays in presenting a view of the web conferencing session at each of the at least one viewing clients and provide an indication of the delays to a user at the presenter client.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a web conferencing system, comprising:

receiving, at a communication interface from a presenter client, a request to initiate a web conferencing session;

establishing the web conferencing session between the presenter client and at least one viewing client;

during the web conferencing session, determining delays in presenting a view of the web conferencing session at each of the at least one viewing clients based on a first indication, received from each of the at least one viewing clients, of a view of the web conferencing session that is currently being presented at each of the at least one viewing clients; and providing a second indication of the delays to a user at the presenter client.

2. The method of claim 1, wherein the indication informs the user of a delay determined at a most delayed viewing client of the at least one viewing clients.

3. The method of claim 1, wherein the indication informs the user of an average delay for at least a portion of the at least one viewing clients.

4. The method of claim 3, wherein at least the portion of the at least one viewing clients comprises a majority of the at least one viewing clients.

5. The method of claim 1, wherein determining the delays comprises:

receiving the first indication from each of the at least one viewing clients;

based on the first indication, determining the delays based on a difference in web conferencing session run time between a view of the web conferencing session currently being received from the presenter client and the view of the web conference as currently presented at each of the at least one viewing clients.

6. The method of claim 5, wherein the first indication indicates a watermark added to the web conferencing session that changes over time and the difference in web conferencing session run time is determined based on the changes to the watermark.

7. The method of claim 1, wherein the second indication comprises a presentation of a monitor view of the web conferencing session to the user at the presenter client, wherein the monitor view comprises a frame displaying a view of the web conferencing session as currently displayed at one of the at least one viewing clients.

8. The method of claim 7, wherein the second indication further comprises an indication of the number of the at least one viewing clients seeing the monitor view of the web conferencing session.

9. The method of claim 1, wherein the second indication comprises a guide to the user of the presentation client for pacing a presentation that is a subject of the web conferencing session.

10. The method of claim 1, wherein the second indication comprises a delay value representing the delays in presenting the view of the web conferencing session.

11. A web conferencing server, comprising:

a communication interface configured to receive, from a presenter client, a request to initiate a web conferencing session;

a processing system configured to establish the web conferencing session between the presenter client and at least one viewing client and, during the web conferencing session, determine delays in presenting a view of the web conferencing session at each of the at least one viewing clients based on a first indication, received from each of the at least one viewing clients, of a view of the web conferencing session that is currently being presented at each of the at least one viewing clients and provide a second indication of the delays to a user at the presenter client.

12. The web conferencing server of claim 11, wherein the indication informs the user of a delay determined at a most delayed viewing client of the at least one viewing clients.

13. The web conferencing server of claim 11, wherein the indication informs the user of an average delay for at least a portion of the at least one viewing clients.

14. The web conferencing server of claim 13, wherein at least the portion of the at least one viewing clients comprises a majority of the at least one viewing clients.

15. The web conferencing server of claim 11, wherein to determine the delays:

the communication interface is configured to receive the first indication from each of the at least one viewing clients;

the processing system is configured to, based on the first indication, determine the delays based on a difference in web conferencing session run time between a view of the web conferencing session currently being received from the presenter client and the view of the web conference as currently presented at each of the at least one viewing clients.

16. The web conferencing server of claim 15, wherein the first indication indicates a watermark added to the web conferencing session that changes over time and the difference in web conferencing session run time is determined based on the changes to the watermark.

17. The web conferencing server of claim 11, wherein the second indication comprises a presentation of a monitor view of the web conferencing session to the user at the presenter client, wherein the monitor view comprises a frame displaying a view of the web conferencing session as currently displayed at one of the at least one viewing clients.

18. The web conferencing server of claim 17, wherein the second indication further comprises an indication of the number of the at least one viewing clients seeing the monitor view of the web conferencing session.

19. The web conferencing server of claim 11, wherein the second indication comprises a guide to the user of the presentation client for pacing a presentation that is a subject of the web conferencing session.

20. The web conferencing server of claim 11, wherein the second indication comprises a delay value representing the delays in presenting the view of the web conferencing session.

* * * * *